United States Patent
Eguchi et al.

(10) Patent No.: US 11,685,438 B2
(45) Date of Patent: Jun. 27, 2023

(54) VEHICLE CONTROL APPARATUS AND VEHICLE

(71) Applicant: HONDA MOTOR CO., LTD., Tokyo (JP)

(72) Inventors: Atsuhiro Eguchi, Wako (JP); Shuichi Kosaka, Wako (JP); Ryo Kawaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 17/191,801

(22) Filed: Mar. 4, 2021

(65) Prior Publication Data

US 2021/0284235 A1    Sep. 16, 2021

(30) Foreign Application Priority Data

Mar. 13, 2020    (JP) .............................. JP2020-044374

(51) Int. Cl.
*B62D 15/02*    (2006.01)
*B60Q 9/00*    (2006.01)

(52) U.S. Cl.
CPC ............. *B62D 15/025* (2013.01); *B60Q 9/00* (2013.01)

(58) Field of Classification Search
None
See application file for complete search history.

(56) References Cited

U.S. PATENT DOCUMENTS

| 9,604,649 B1 * | 3/2017 | Pastor ..................... B62D 15/00 |
| 10,081,358 B2 | 9/2018 | Shimizu et al. |
| 2013/0158771 A1 * | 6/2013 | Kaufmann ............... B62D 6/00 701/1 |
| 2016/0200354 A1 * | 7/2016 | Kimura ................ B62D 5/0472 701/42 |
| 2017/0015351 A1 * | 1/2017 | Endo ..................... B62D 5/0463 |
| 2018/0172528 A1 * | 6/2018 | Kim ....................... B60W 40/08 |
| 2018/0186372 A1 | 7/2018 | Shimizu et al. |
| 2020/0231206 A1 * | 7/2020 | Tsubaki ................. B62D 5/046 |
| 2021/0276616 A1 * | 9/2021 | Inden ................... B62D 15/025 |

FOREIGN PATENT DOCUMENTS

| JP | 5973900 B2 | 8/2016 |
| JP | 2017-013527 A | 1/2017 |
| JP | 2018-183046 A | 11/2018 |
| JP | 2019-162918 A | 9/2019 |
| JP | 2019-189177 A | 10/2019 |

OTHER PUBLICATIONS

Japanese Office Action issued for Japanese Patent Application No. 2020-044374 dated Dec. 17, 2021 (with Partial Translation).

\* cited by examiner

*Primary Examiner* — Jeff A Burke
*Assistant Examiner* — Jerrod Irvin Davis
(74) *Attorney, Agent, or Firm* — Thomas | Horstemeyer, LLP

(57) ABSTRACT

A vehicle control apparatus is provided. The apparatus comprises a sensor to detect a steering torque applied to a steering shaft that rotates in accordance with a steering wheel operation; a steering assistance unit configured to assist steering by a lane keeping assistance function; a correcting unit configured to obtain a corrected torque by removing a torque caused due to the steering assistance unit from the steering torque detected by the sensor; and a determining unit configured to determine whether or not a driver is in a hands-off state based on the corrected torque.

7 Claims, 4 Drawing Sheets

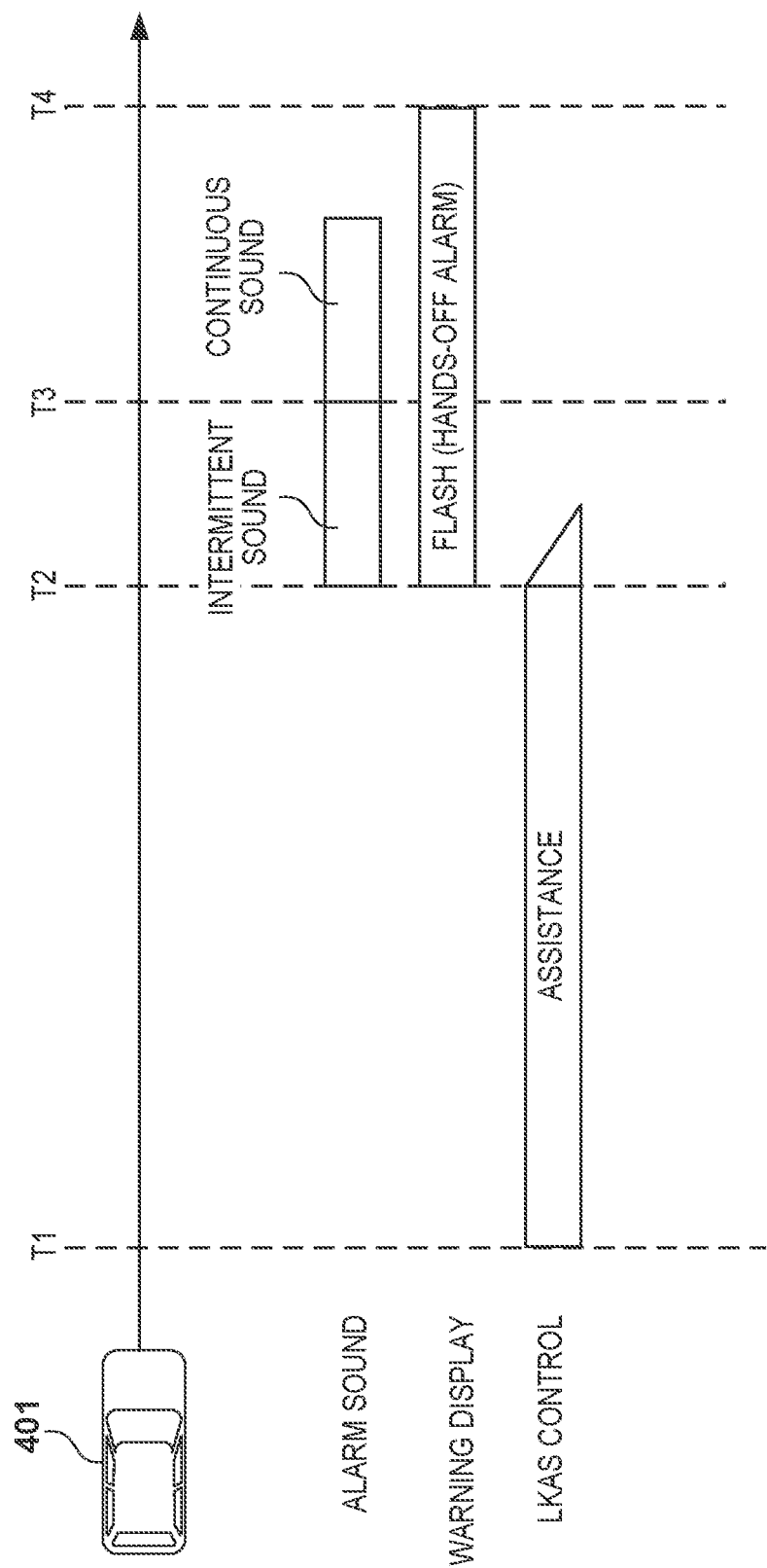

VEHICLE CONTROL APPARATUS AND VEHICLE

CROSS-REFERENCE TO RELATED APPLICATION(S)

This application claims priority to and the benefit of Japanese Patent Application No. 2020-44374 filed on Mar. 13, 2020, the entire disclosure of which is incorporated herein by reference.

BACKGROUND OF THE INVENTION

Field of the Invention

The present invention relates to a vehicle control apparatus and a vehicle on which the vehicle control apparatus is mounted.

Description of the Related Art

A lane keeping assistance system (hereinafter, abbreviated as LKAS, and may also be called as "lane keeping assistance") is one of driving assistance functions of automobiles. The LKAS only assists driving, and therefore a driver needs to perform driving independently by operating a steering wheel, similarly to a case where the driving assistance is not implemented.

Therefore, while the LKAS is operating, whether or not the driver is operating a steering wheel is monitored, and if it is determined that the driver is not operating a steering wheel, the LKAS is stopped. Accordingly, a technique for estimating the steering state of a driver by detecting a steering torque acted on a steering shaft is described in Japanese Patent No. 5973900. Furthermore, in Japanese Patent No. 5973900 (claim 1, Paragraphs 0015 and 0037, in particular), a technique is described in which the pitching of a vehicle body is detected, and the steering state of a driver is estimated based on the change in torque that is obtained by removing the noise relating to the pitching from a detected steering torque.

However, the noise factor that exerts an influence on the steering torque is not limited to the pitching of a vehicle body. Therefore, the steering state of a driver needs to be estimated by excessively estimating the noise component included in the detected steering torque, and as a result, the estimated result is not necessarily accurate.

SUMMARY OF THE INVENTION

The present invention provides a vehicle control apparatus and a vehicle for highly accurately estimating the steering state of a driver.

The present invention includes a following configuration. According to one aspect of the invention, a vehicle control apparatus is provided, the apparatus comprising: a sensor configured to detect a steering torque applied to a steering shaft that rotates in accordance with a steering wheel operation; a steering assistance unit configured to assist steering by a lane keeping assistance function; at least one processor; and at least one memory storing a program which, when executed by the processor, causes the at least one processor to operate as: a correcting unit configured to obtain a corrected torque by removing a torque caused due to the steering assistance unit from the steering torque detected by the sensor; and a determining unit configured to determine whether or not a driver is in a hands-off state based on the corrected torque.

According to the present invention, the steering state of a driver can be highly accurately estimated.

BRIEF DESCRIPTION OF THE DRAWINGS

FIG. 4 is a diagram illustrating an example of operations of a lane keeping assistance function based on an estimated steering state.

DESCRIPTION OF THE EMBODIMENTS

Figure 1:
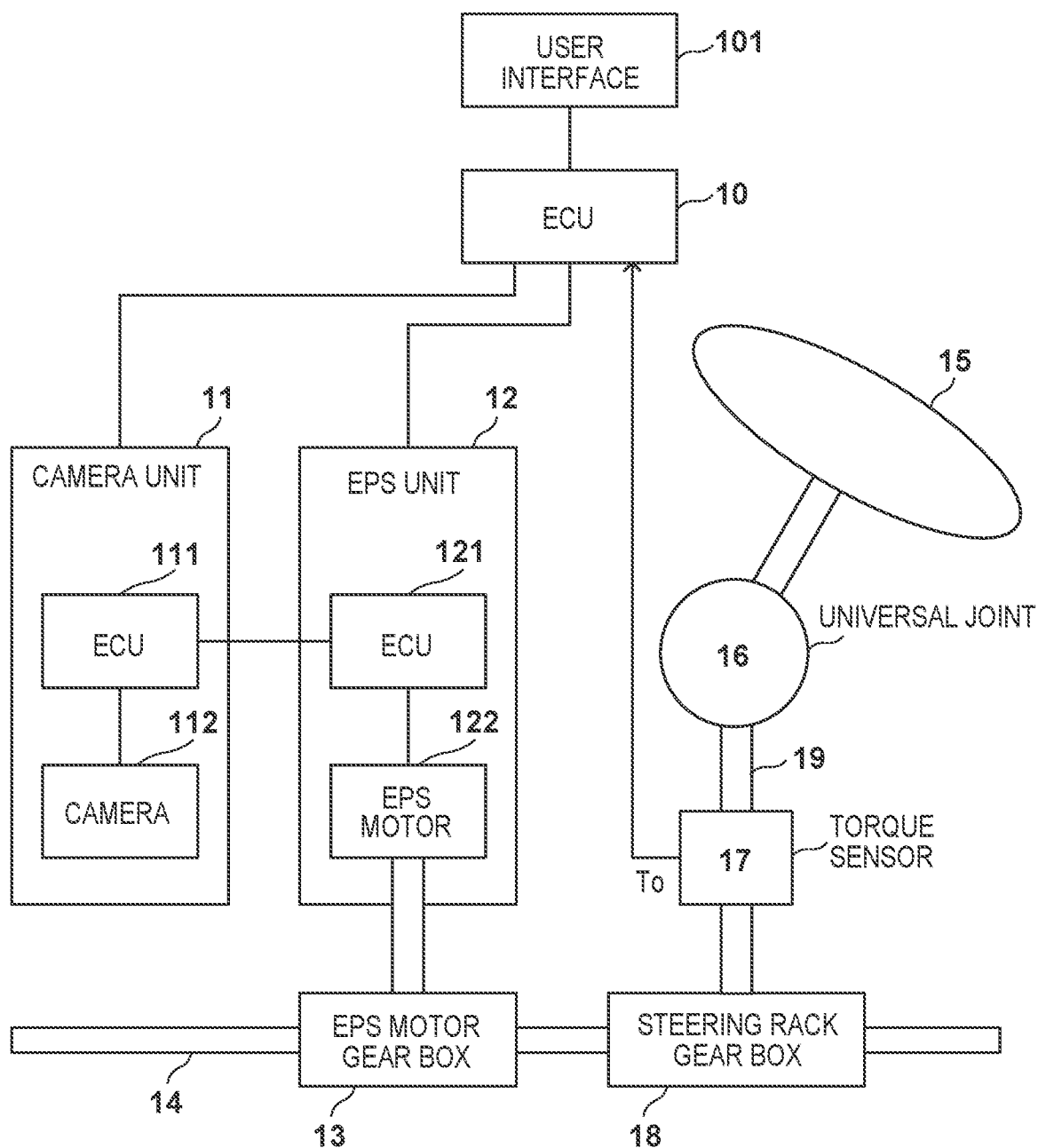
FIG. 1 is a block diagram illustrating an example of a driving assistance system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Lane Keeping Assistance Function

First, the lane keeping assistance function according to the present embodiment will be briefly described. The lane keeping assistance function is a function of reducing driving load of a driver by assisting a steering operation so as to keep the car in the vicinity of the center of a lane when traveling on a road, specifically on an expressway. The lane keeping assistance function is activated when the driver intends to activate the function by operating a switch for activating the function, or the like. The lane keeping assistance system (LKAS) for realizing the lane keeping assistance function includes a camera serving as a sensor and an electric power steering (EPS) motor serving as an actuator, and the function is realized by these components being controlled by an ECU (engine control unit). Specifically, the lane (solid line/broken line) is detected by the camera, and the steering operation is assisted so as to perform traveling such that the car keeps in the vicinity of the center of the lane. The steering control is weakly assisted when the car is traveling in the vicinity of the center of the lane, and the degree of assistance is increased as the car approaches the lane marking (solid line/broken line). When there is a risk of deviating from the lane, an attention is called by a display in a meter, and the steering operation is assisted such that the car returns to the vicinity of the center of the lane. Also, when the system determines that the driver is in a state of hands off from the steering or that the driver intentionally performing steering operation so as to across the lane marking, or when the direction indicator is operated, the lane keeping assistance function does not function.

System Configuration

FIG. 1 is a block diagram of a driving assistance system of the present embodiment. The driving assistance system is to be mounted on a vehicle such as an automobile. The block diagram in FIG. 1 is illustrated by focusing on only the lane keeping assistance function as the driving assistance function, and the other functions are not illustrated. In FIG. 1, an ECU 10 is an ECU for performing overall control of the vehicle, and includes a processor, a memory, and the like, for example. A camera unit 11 include a camera control ECU 111 and a camera 112 that is attached to an interior of the vehicle, for example, and shoots a forward area of the vehicle through the front window.

An electric power steering system (EPS) unit 12 includes an ECU 121 for controlling the EPS and an EPS motor 122 that is a driving source for steering. The ECU 121 inputs, to an EPS motor 122, a driving signal in accordance with an LKAS instruction signal indicating the target steering direction and steering amount for LKAS control that is input from the ECU 10. A pinion gear that engages with a rack 14 and is housed in an EPS motor gear box 13 is attached to the shaft of the EPS motor 122. The rack 14, which is not illustrated, drives a knuckle arm via a tie rod, and with this, the steering is performed by moving the respective front wheels on the left and right of the vehicle.

On the other hand, when the driver operates a steering wheel 15, a steering shaft 19 is rotated via a universal joint 16 that is attached to the shaft of the steering wheel 15. Accordingly, the universal joint 16 constitutes a bent portion of the steering shaft 19. A pinion gear that is housed in a steering gear box 18 is provided in an end portion of the steering shaft 19, and the pinion gear engages with the rack 14. Also, the torque that is exerted on the steering shaft 19 is detected by a torque sensor 17, and is input to the ECU 10 as a steering torque signal To.

The ECU 10 estimates the steering state of the driver based on the steering torque signal To that has been input, and if it is determined to be a hands-off state in which the driver takes hands off from the steering wheel, stops the LKAS function. Also, at this time, an alarm is made to the driver through a user interface 101 including a display apparatus, a speaker, and the like.

Here, the steering torque to be detected by the torque sensor 17 will be briefly described. The steering torque to be detected by the torque sensor 17 includes a torque for rotating the steering shaft 19 due to the rotating operation of the steering wheel 15, and a torque for rotating the steering shaft 19 exerted by the rack 14 and the pinion gear, which is not illustrated, via the steering gear box 18. The force for moving the rack 14 other than the force generated when the steering wheel is operated includes a force generated due to steering by the EPS motor 122, and a torque for causing the running direction of the front wheels to change that is exerted from a road surface or generated due to tire alignment. The torque sensor 17 detects a value that is a result of combining these torques. While the LKAS is activated, if the driver grips the steering wheel 15, a torque exerted from the steering gear box 18 due to steering by the LKAS is detected, and if the driver holds the steering wheel 15 at this time, the torque to be detected includes a torque generated due to the driver operating the steering wheel. The fact that the driver holds the steering wheel 15 is determined based on the torque generated due to operation of the steering wheel 15. Therefore, in order to accurately determine the hands-off state, it is desirable to correct the steering torque by removing the torque generated due to the LKAS from the steering torque detected by the torque sensor 17. Note that the torque component applied by the EPS motor 122 is noise to the torque generated by steering wheel operation, and therefore is called as a noise torque or a torque noise in the present embodiment.

Moreover, in the universal joint 17, its driving side and driven side will not enter a complete neutral state even at a time of traveling straight, and stabilize in a state in which the steering wheel 15 is slightly shifted from the state of traveling straight. This state is a state in which the front wheels are operated to a direction slightly shifted from the direction of traveling straight. Therefore, a torque (called as a "self-aligning torque (SAT)") for causing the front wheels to return to the direction of traveling straight is exerted on the steering shaft 19 via the steering gear box 18, and the torque is detected by the torque sensor 17. In this way, an offset torque component is generated in the vicinity of the steering angle of 0 degrees, which is caused by the universal joint. In the present embodiment, this torque component is also called as an offset torque or a torque offset.

Figure 2:
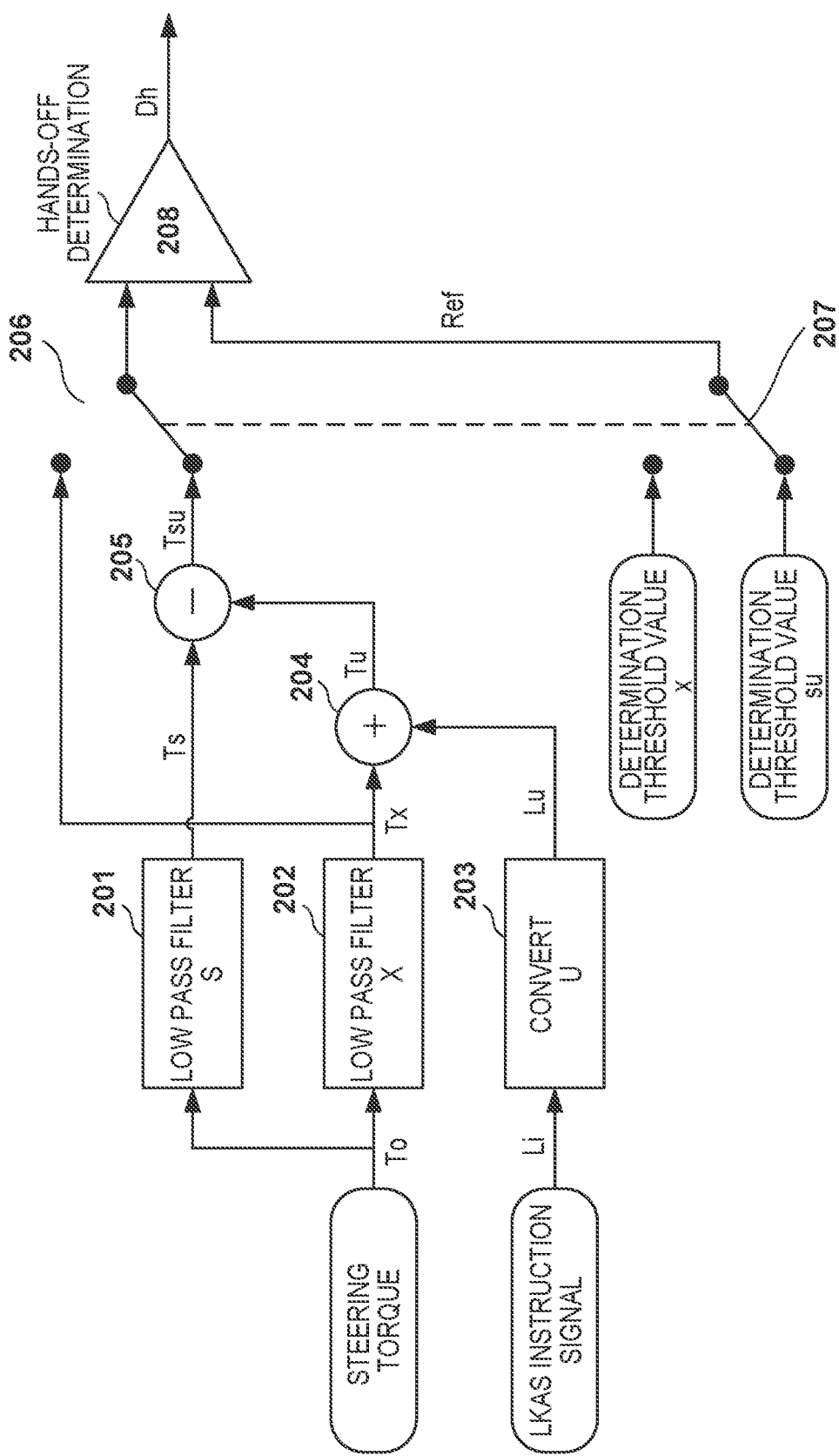
FIG. 2 is a block diagram for performing estimation of a steering state.

As a result of the mechanism described above, the driver can perform steering by operating the steering wheel 15. Also, the torque for rotating the steering wheel 15 is detected by the torque sensor 17. As described above, the steering torque detected by the torque sensor 17 may include a torque noise and a torque offset. Therefore, the ECU 10 corrects the detected torque by removing these values. The circuit configuration of a torque correction circuit for this purpose is shown in FIG. 2. Note that all of the constituent elements in FIG. 2 may also be realized by software. Also, the constituent elements in FIG. 2 may also be implemented by another ECU such as the ECU 121 instead of the ECU 10.

Torque Correction Circuit

In FIG. 2, a torque To detected by the torque sensor 17 is input to a low pass filter S 201 and a low pass filter X 202. The low pass filter S 201 is a filter for extracting a torque offset, and whose pass frequency is set to be lower than that of the low pass filter X 202. That is, the low pass filter S 201 has a cutoff frequency that is lower than that of the low pass filter X 202. In the present embodiment, the pass frequency of the low pass filter S 201 is about 1 Hz or lower, for example, but this value may be determined experimentally. Accordingly, the low pass filter S 201 can extract the offset torque component included in the detected steering torque.

The low pass filter X 202 is a filter for detecting a torque including the torque offset and torque noise. In this example, the upper limit of the pass frequency is about 5 Hz, but this value can also be experimentally determined so as to pass the frequency of the change in steering torque due to steering wheel operation or driving by the EPS motor. An output signal Tx of the low pass filter X 202 is a signal in which a high frequency component is removed from the steering torque To, and this signal Tx may also be called as a steering torque in the following description.

An LKAS instruction signal Li has a value indicating the amount of driving of the EPS motor 122 when the LKAS is activated, and the value may be a current value of the signal, or the like. Note that the value may be a digitized value. The LKAS instruction signal Li is input to a conversion unit U 203, and is converted to a torque Lu to be exerted on the steering shaft 19. The EPS motor 122 generates a torque according to the LKAS instruction signal Li, and therefore the torque to be exerted on the steering shaft 19 via the gear boxes 13 and 18 and the rack 14 can be estimated based on the value of the LKAS instruction signal Li. Therefore, the conversion unit U 203 may be a unit that performs mapping for converting the value of the LKAS instruction signal Li to a torque, for example.

An output Tx of the low pass filter X 202 and an output Lu of the conversion unit U 203 are added by an adder 204. An output Tu of the adder 204 indicates the torque in which the torque noise generated by the EPS motor 122 is removed from the steering torque Tx. The reason why addition is performed for removal is that, if the torque applied by the rack 14 and the torque applied by the steering wheel 15 are torques in the same direction, the values of these torques have opposite signs. The torque Tu in which the torque noise is removed is input to a subtracter 205 along with an output of the low pass filter S 201, which is a torque offset Ts, and a torque Tsu in which the torque offset Ts is subtracted from the torque Tu is output. That is, the torque Tsu is a corrected torque in which the torque noise and the torque offset are removed from the steering torque Tx.

The corrected torque Tsu is input to a hands-off determination unit 208 via a switch 206, and the absolute value thereof is compared with a determination threshold value su that is input via a switch 207. The hands-off determination unit 208 outputs a determination result Dh as the result of comparison. The determination result Dh indicates, if the absolute value of the corrected torque Tsu is smaller than the determination threshold value su, a hands-off state in which the driver releases the hands off the steering wheel, and if the absolute value of the corrected torque Tsu is the determination threshold value su or more, a fact of not being in the hands-off state.

The switch 206 operates together with the switch 207. When the switch 206 switches the input to the hands-off determination unit 208 between the steering torque Tx and the corrected torque Tsu, the switch 207, in accordance therewith, if the corrected torque Tsu is input to the hands-off determination unit 208, selects the determination threshold value su, and if the steering torque Tx is input thereto, selects the determination threshold value x. It is expected that the value of the corrected torque Tsu decreases by an amount corresponding to the amount of the torque noise Tu and torque offset Ts that are removed from the steering torque Tx. Therefore, the determination threshold value su may be smaller than the determination threshold value x. For example, the determination threshold value su can be set to about 0.2 Nm, and the determination threshold value x can be set to about 0.5 Nm. The switching of the switches 206 and 207 may be manually performed by the driver, or performed in accordance with the traveling condition. The configuration may be such that, when the amount of operation made by the steering wheel 15 is expected to be small, as the traveling condition, the determination is made based on the corrected torque. For example, when traveling straight, the hands-off determination may be made based on the corrected torque, and when traveling along a curve, the hands-off determination may be made based on the uncorrected steering torque.

Note that the hands-off determination unit 208 outputs a determination result Dh at a certain timing based on the corrected torque Tsu or the uncorrected steering torque Tx. This determination result Dh does not necessarily reflect the hands-off state. For example, when traveling straight, the steering direction is not one of left and right, and a minute steering toward left and right may be alternatingly performed, for example. In such a transient state, a period may be present in which the torque is smaller than the threshold value when the steering direction changes. In this way, it is possible that, even when hands-off is not performed, the hands-off determination result Dh at a certain timing indicates "hands-off". Therefore, it may be determined to be hands-off after when the state in which the hands-off determination result Dh indicates "hands-off" continues for a predetermined time.

Figure 3:
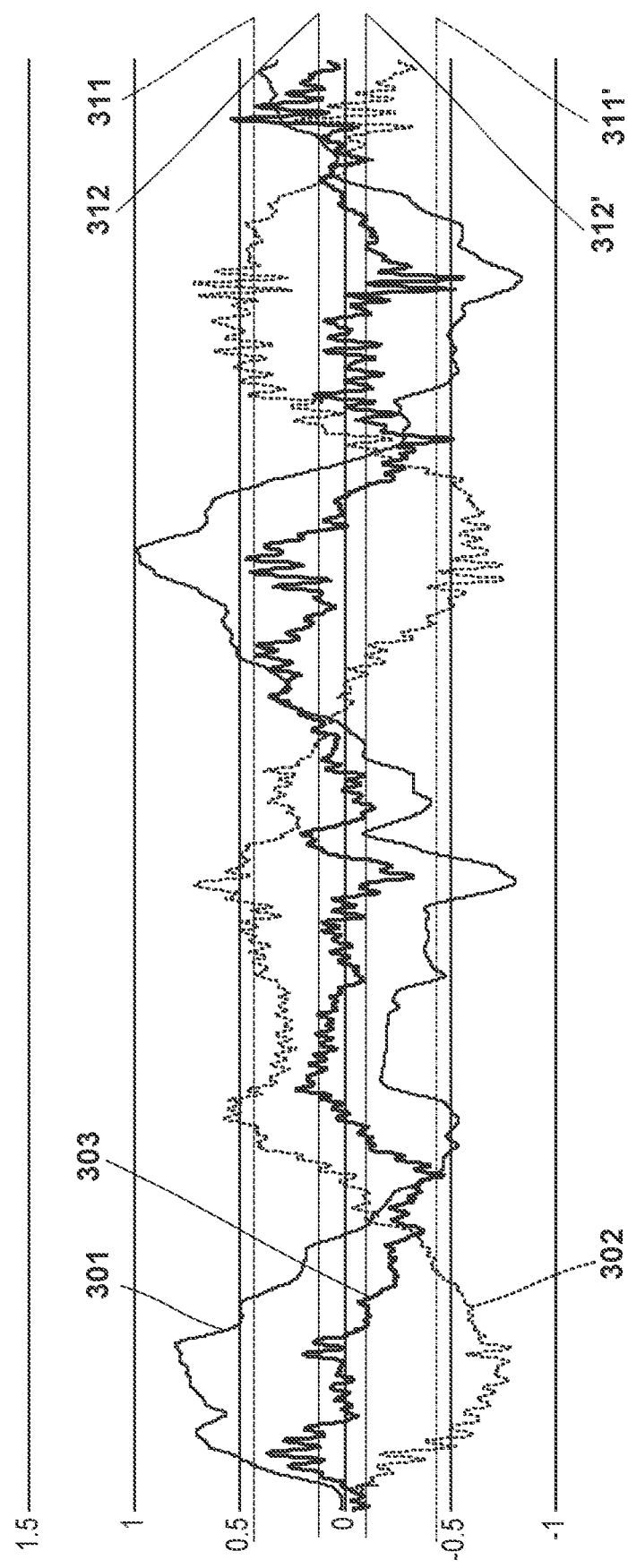
FIG. 3 is a diagram illustrating an example of steering torque correction.

An example of the steering torque correction is shown in FIG. 3. In FIG. 3, a signal 301 indicates the steering torque Tx detected by the torque sensor 17, a signal 302 indicates the torque noise Lu, and a signal 303 indicates the corrected torque Tsu. Also, values 311 and 311' indicate the determination threshold value x, and values 312 and 312' indicate the determination threshold value su. In the description of FIG. 2, the absolute value of the corrected torque is compared with the determination threshold value, but in FIG. 3, each torque is shown with the original sign, and each determination threshold value is shown with plus and minus signs. The sign of a torque changes according to the direction thereof, and therefore each determination threshold value is shown with values obtained by adding plus and minus signs to one absolute value.

As is clear from FIG. 3, the value in which the torque noise 302 is added to the steering torque 301 is the corrected torque 303. When hands-off determination is performed based on the corrected torque 303, the corrected torque 303 is compared with the determination threshold values 312 and 312', and if the corrected torque 303 is inside the two threshold values, it is determined to be hands-off, and if the corrected torque 303 is outside the two threshold values, it is determined to not be hands-off. When hands-off determination is performed based on the uncorrected steering torque 301, the uncorrected steering torque 301 is compared with the determination threshold values 311 and 311', and if the uncorrected steering torque 301 is inside the two threshold values, it is determined to be hands-off, and if the uncorrected steering torque 301 is outside the two threshold values, it is determined to not be hands-off. In this way, the absolute value of the corrected torque is a value smaller than the value of the uncorrected steering torque, and is a value indicating, more accurately, the operation torque of the steering wheel 15 operated by the driver. Therefore, regarding the corrected torque, a smaller value can be used as the determination threshold value, instead of a value in which noise is considered, and more accurate determination can be expected.

An exemplary control of the LKAS based on the hands-off determination according to the present embodiment is shown in FIG. 4. The lane keeping assistance system as shown in FIGS. 1 and 2 is mounted on a vehicle 401. While the vehicle 401 is traveling, the LKAS is turned on at timing T1, and the LKAS control (assistance) is started. At timing T2, hands-off is detected. That is, "hands off" is continuously output for a predetermined period as the hands-off determination result Dh. In response to the determination, the ECU 10 causes the user interface 101 to output an intermittent alarm sound, for example. At the same time, a hands-off alarm lamp of the user interface 101 is caused to flash. In addition thereto, the assistance level of the assistance operation of the LKAS is decreased by gradually decreasing the driving torque of the EPS motor 122, or the like, and the assistance operation is ultimately stopped. At timing T3 at which a predetermined time has elapsed from timing T2, the ECU 10 switches the alarm sound from an intermittent sound to a continuous sound. At timing T4 at which a fixed period has elapsed from timing T3, outputting of the alarm sound is stopped.

Other Embodiments

Note that, in the present embodiment, the steering by the electric power steering is structured so as to drive the steering rack independently from the manual steering. The present invention can also be applied to a structure in which a torque is applied to the steering shaft 19 for manual steering by the EPS motor. Note that, in this case, the torque from the steering wheel 15 and the torque due to the EPS motor are indicated by values having the same sign if the directions thereof are the same. Therefore, in this modification, a subtracter for subtracting the torque noise Lu from the steering torque Tx may be used instead of the adder 204 in FIG. 2.

Also, in the configuration in FIG. 2, switching between the determination threshold value x and the determination threshold value su is performed by the switch 207, but a configuration may be adopted in which the switch 207 is omitted, and a fixed value is set to the determination threshold value. That is, even if the value of torque to be input to the hands-off determination unit 208 is switched between the corrected torque su and the uncorrected steering torque x, the hands-off determination threshold value need not be changed, and may be a fixed value.

Moreover, in the configuration in FIG. 2, correction is made by removing the torque noise from the steering torque that is an output of the low pass filter X 202, and furthermore removing the torque offset that is an output of the low pass filter S 201 therefrom. Instead thereof, the configuration may also be such that the detected steering torque To is filtered by a bandpass filter whose passband is 1 Hz to 5 Hz, and the torque noise Lu is removed therefrom.

Effects of Embodiment

As described above, according to the vehicle control apparatus of the present embodiment, when the lane keeping assistance system is operating, the detected steering torque is corrected by removing a torque due to intervention of the lane keeping assistance system, and as a result, highly accurate hands-off determination can be realized. Moreover, the accuracy of the hands-off determination can further be improved by further removing the torque offset caused due to the universal joint from the steering torque.

Summary of Embodiment

The present embodiment described above can be summarized as follows.

(1) According to a first aspect of the invention, a vehicle control apparatus is provided, the vehicle control apparatus including:

detecting means for detecting a steering torque applied to a steering shaft that rotates in accordance with a steering wheel operation:

steering assistance means for assisting steering by a lane keeping assistance function;

correcting means for obtaining a corrected torque by removing a torque caused due to the steering assistance means from the steering torque detected by the detecting means; and determining means for determining whether or not a driver is in a hands-off state based on the corrected torque.

According to this configuration, the torque caused due to the lane keeping function is removed from the detected steering torque, and the accuracy of hands-off determination can be improved.

(2) According to a second aspect of the invention, a vehicle control apparatus is provided that is the vehicle control apparatus according to (1), wherein the correcting means obtains the corrected torque by correcting the steering torque detected by the detecting means using a torque corresponding to a value indicated by the steering assistance means regarding steering.

According to this configuration, the torque corresponding to a value indicated by the lane keeping function is removed from the steering torque, and the accuracy of hands-off determination can be improved.

(3) According to a third aspect of the invention, a vehicle control apparatus is provided that is the vehicle control apparatus according to (2), wherein the steering assistance means assists steering not via the steering shaft, and the correcting means obtains the corrected torque by adding a torque corresponding to a value indicated by the steering assistance means regarding steering to the steering torque detected by the detecting means.

According to this configuration, with respect to a configuration in which steering is supported not via the steering shaft as well, the torque corresponding to a value indicated by the lane keeping function is removed from the steering torque, and the accuracy of hands-off determination can be improved.

(4) According to a fourth aspect of the invention, a vehicle control apparatus is provided that is the vehicle control apparatus according to any of (1) to (3), wherein a frequency component lower than a predetermined frequency of the steering torque detected by the detecting means is removed by a filter.

According to this configuration, a low frequency change in torque that is applied from the outside is removed from the steering torque, and the accuracy of hands-off determination can further be improved.

(5) According to a fifth aspect of the invention, a vehicle control apparatus is provided that is the vehicle control apparatus according to (4), wherein an offset torque component caused due to a universal joint that forms a bent portion of the steering shaft is removed by removing a frequency component, of the steering torque detected by the detecting means, that is lower than a predetermined frequency using a filter.

According to this configuration, an offset torque component caused due to the universal joint is removed from the steering torque, and the accuracy of hands-off determination can further be improved.

(6) According to a sixth aspect of the invention, a vehicle control apparatus is provided that is the vehicle control apparatus according to (4) or (5), wherein the correcting means obtains an offset torque component by applying a first low pass filter to the steering torque detected by the detecting means, and removes the offset torque component from a torque subjected to filtering that is obtained by applying a second low pass filter to the steering torque detected by the detecting means, and the first low pass filter allows a frequency domain to pass, the frequency domain being lower than a frequency domain that is allowed to pass by the second low pass filter.

According to this configuration, the steering torque can be corrected by obtaining the offset torque component highly accurately, and the accuracy of hands-off determination can be improved.

(7) According to a seventh aspect of the invention, a vehicle control apparatus is provided that is the vehicle control apparatus according to any of (1) to (6), the vehicle control apparatus further including means for outputting an alarm to a driver when the determining means has determined that the driver is in a hands-off state based on the corrected torque.

According to this configuration, an alarm can be issued when it is detected that the driver is in a hands-off state.

(8) According to an eighth aspect of the invention, a vehicle control apparatus is provided that is the vehicle control apparatus according to (1) to (6), the vehicle control apparatus further including means for outputting an alarm to a driver when the state in which the determining means has determined that the driver is in a hands-off state based on the corrected torque has continued for a predetermined period.

According to this configuration, a transient state can be prevented from being detected as a driver being in a hands-off state, and therefore the hands-off can be detected highly accurately.

(9) According to a ninth aspect of the invention, a vehicle on which the vehicle control apparatus according to (1) to (8) is mounted is provided.

According to this configuration, a vehicle can be provided in which a driver being in a hands-off state can be highly accurately detected when the lane keeping assistance function is operated.

The invention is not limited to the foregoing embodiments, and various variations/changes are possible within the spirit of the invention.

What is claimed is:

1. A vehicle control apparatus comprising:
   a sensor configured to detect a steering torque applied to a steering shaft that rotates in accordance with a steering wheel operation;
   a steering assistance unit configured to assist steering by a lane keeping assistance function;
   at least one processor; and
   at least one memory storing a program which, when executed by the processor, causes the at least one processor to operate as:
     a correcting unit configured to obtain a corrected torque by removing a torque caused due to the steering assistance unit from the steering torque detected by the sensor; and
     a determining unit configured to determine whether or not a driver is in a hands-off state based on the corrected torque,
   wherein a frequency component lower than a predetermined frequency of the steering torque detected by the sensor is removed by a filter, and
   wherein an offset torque component caused due to a universal joint that forms a bent portion of the steering shaft is removed by removing a frequency component, of the steering torque detected by the sensor, that is lower than a predetermined frequency using a filter.

2. The vehicle control apparatus according to claim 1, wherein the correcting unit obtains the corrected torque by correcting the steering torque detected by the sensor using a torque corresponding to a value indicated by the steering assistance unit regarding steering.

3. The vehicle control apparatus according to claim 2,
   wherein the steering assistance unit assists steering not via the steering shaft, and
   the correcting unit obtains the corrected torque by adding a torque corresponding to a value indicated by the steering assistance unit regarding steering to the steering torque detected by the sensor.

4. The vehicle control apparatus according to claim 1,
   wherein the correcting unit obtains an offset torque component by applying a first low pass filter to the steering torque detected by the sensor, and removes the offset torque component from a torque subjected to filtering that is obtained by applying a second low pass filter to the steering torque detected by the sensor, and
   the first low pass filter allows a frequency domain to pass, the frequency domain being lower than a frequency domain that is allowed to pass by the second low pass filter.

5. The vehicle control apparatus according to claim 1, further comprising a unit configured to output an alarm to a driver when the determining unit has determined that the driver is in a hands-off state based on the corrected torque.

6. The vehicle control apparatus according to claim 1, wherein the program further causes the processor to operate as a unit configured to output an alarm to a driver when the state in which the determining unit has determined that the driver is in a hands-off state based on the corrected torque has continued for a predetermined period.

7. A vehicle on which a vehicle control apparatus is mounted, the vehicle control apparatus comprising:
   a sensor configured to detect a steering torque applied to a steering shaft that rotates in accordance with a steering wheel operation;
   a steering assistance unit configured to assist steering by a lane keeping assistance function;
   at least one processor; and
   at least one memory storing a program which, when executed by the processor, causes the at least one processor to operate as:
     a correcting unit configured to obtain a corrected torque by removing a torque caused due to the steering assistance unit from the steering torque detected by the sensor; and
     a determining unit configured to determine whether or not a driver is in a hands-off state based on the corrected torque,
   wherein a frequency component lower than a predetermined frequency of the steering torque detected by the sensor is removed by a filter, and
   wherein an offset torque component caused due to a universal joint that forms a bent portion of the steering shaft is removed by removing a frequency component, of the steering torque detected by the sensor, that is lower than a predetermined frequency using a filter.

* * * * *